(12) United States Patent
Uejima et al.

(10) Patent No.: US 12,531,586 B2
(45) Date of Patent: Jan. 20, 2026

(54) RADIO FREQUENCY MODULE AND COMMUNICATION DEVICE

(71) Applicant: Murata Manufacturing Co., Ltd., Kyoto (JP)

(72) Inventors: Takanori Uejima, Kyoto (JP); Hiromichi Kitajima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 524 days.

(21) Appl. No.: 18/303,621

(22) Filed: Apr. 20, 2023

(65) Prior Publication Data

US 2023/0261682 A1 Aug. 17, 2023

Related U.S. Application Data

(63) Continuation of application No. PCT/JP2021/036902, filed on Oct. 6, 2021.

(30) Foreign Application Priority Data

Nov. 16, 2020 (JP) .................................. 2020-190101

(51) Int. Cl.
  *H04B 1/18* (2006.01)
  *H04B 1/16* (2006.01)

(52) U.S. Cl.
  CPC .............. *H04B 1/18* (2013.01); *H04B 1/1607* (2013.01)

(58) Field of Classification Search
  CPC ........ H04B 1/00; H04B 1/006; H04B 1/1607; H04B 1/18; H04B 1/38; H04B 1/40;
  (Continued)

(56) References Cited

U.S. PATENT DOCUMENTS

2018/0092257 A1   3/2018   Otsubo et al.
2018/0204781 A1   7/2018   Otsubo
(Continued)

FOREIGN PATENT DOCUMENTS

JP   2009-010411 A    1/2009
WO   2016/181954 A1   11/2016
(Continued)

OTHER PUBLICATIONS

International Search Report for PCT/JP2021/036902 dated Jan. 11, 2022.

*Primary Examiner* — Nader Bolourchi
(74) *Attorney, Agent, or Firm* — McDonald Hopkins LLC

(57) ABSTRACT

A radio frequency module includes a module substrate having a first principal surface and a second principal surface, a resin member covering the first principal surface and side surfaces of first and second components disposed on the first principal surface, a metal shield layer covering an upper surface of the resin member, a metal shield wall disposed on the first principal surface, a metal member disposed on the second principal surface, and a via conductor penetrating the module substrate. The metal shield wall is disposed between the first component and the second component when the first principal surface is viewed in plan. An upper end of the metal shield wall is connected to the metal shield layer. The via conductor electrically connects the metal shield wall and the metal member, and at least partially overlaps each of the metal shield wall and the metal member when viewed in plan.

20 Claims, 4 Drawing Sheets

(58) Field of Classification Search
CPC ......... H01L 23/00; H01L 23/28; H01L 25/10; H01L 25/18
See application file for complete search history.

(56) References Cited

U.S. PATENT DOCUMENTS

2021/0152210 A1    5/2021  Uejima
2021/0399758 A1   12/2021  Yamaguchi
2023/0275338 A1*   8/2023  Uejima ................ H01Q 1/2283

FOREIGN PATENT DOCUMENTS

| WO | 2017/047539 A1 | 3/2017 |
| WO | 2019/240095 A1 | 12/2019 |
| WO | 2020/179504 A1 | 9/2020 |

* cited by examiner

RADIO FREQUENCY MODULE AND COMMUNICATION DEVICE

CROSS REFERENCE TO RELATED APPLICATION

This is a continuation of International Application No. PCT/JP2021/036902 filed on Oct. 6, 2021 which claims priority from Japanese Patent Application No. 2020-190101 filed on Nov. 16, 2020. The contents of these applications are incorporated herein by reference in their entireties.

BACKGROUND OF THE DISCLOSURE

Field of the Disclosure

The present disclosure relates to a radio frequency module and a communication device.

Description of the Related Art

Patent Document 1 discloses a radio frequency module including a wiring board, a plurality of components mounted on the wiring board, a sealing resin layer for mounting the plurality of components, and a shield wall. The shield wall is disposed between two adjacent components among the plurality of components. This configuration suppresses the noise interference between the components.
Patent Document 1: International Publication No. 2016/181954

BRIEF SUMMARY OF THE DISCLOSURE

However, the conventional radio frequency module described above does not sufficiently reduce the noise interference in some cases.

Thus, the present disclosure provides a radio frequency module and a communication device capable of enhancing an effect of reducing the noise interference.

A radio frequency module according to one aspect of the present disclosure includes a module substrate having a first principal surface and a second principal surface opposite to the first principal surface, a first component and a second component arranged on a first principal surface side, a third component disposed on a second principal surface side, a resin member covering the first principal surface, a side surface of the first component, and a side surface of the second component, a metal layer set to ground potential and covering an upper surface of the resin member, a first metal wall disposed on the first principal surface side and set to the ground potential, a first metal member disposed on the second principal surface side, and a first via conductor penetrating the module substrate, in which the first metal wall is disposed between the first component and the second component when the first principal surface is viewed in plan, an upper end of the first metal wall is in contact with the metal layer, and the first via conductor electrically connects the first metal wall and the first metal member, and at least partially overlaps each of the first metal wall and the first metal member when viewed in plan.

A communication device according to another aspect of the present disclosure includes an RF signal processing circuit configured to process a radio frequency signal transmitted and received by an antenna, and the radio frequency module according to the one aspect configured to transmit the radio frequency signal between the antenna and the RF signal processing circuit.

According to the present disclosure, an effect of reducing the noise interference can be enhanced.

DETAILED DESCRIPTION OF THE DISCLOSURE

Figure 1:
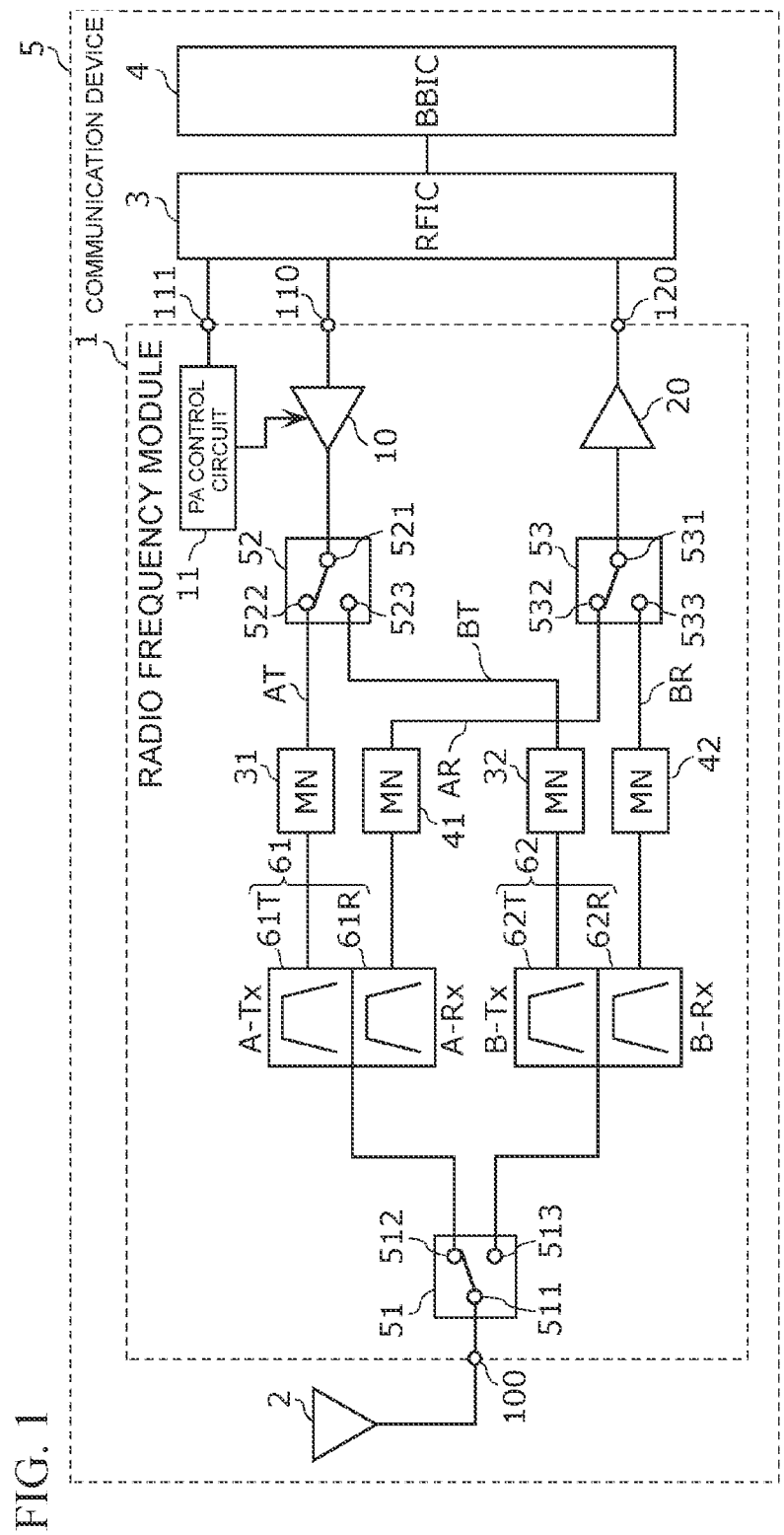
FIG. 1 is a circuit configuration diagram of a radio frequency module and a communication device according to Embodiment.

Hereinafter, a radio frequency module and a communication device according to Embodiment of the present disclosure will be described in detail with reference to the drawings. Note that each of the embodiments described below is a specific example of the present disclosure. Thus, numerical values, shapes, materials, constituent elements, arrangement and connection of the constituent elements, and the like illustrated in the following embodiments are examples, and are not intended to limit the present disclosure. Therefore, among the constituent elements in the following embodiments, constituent elements not described in independent claims are described as optional constituent elements.

In addition, the drawings are schematic diagrams and are not necessarily strictly illustrated. Thus, for example, scales and the like do not necessarily match in the drawings. In the drawings, substantially the same components are denoted by the same reference numerals, and redundant descriptions thereof will be omitted or simplified.

In this specification, terms indicating relationships between elements such as parallel or perpendicular, terms indicating shapes of elements such as rectangles or straight lines, and numerical ranges are not expressions representing only strict meanings, but expressions representing substantially equivalent ranges, for example, expressions including differences of several percent.

In this specification, the terms "upper" and "lower" do not refer to an upward direction (vertically upward) and a downward direction (vertically downward) in absolute spatial recognition, but are used as terms defined by relative positional relationships based on a layering order in a layered configuration. Thus, for example, an "upper surface" or a "top surface" of a component or a member can be any of surfaces in various directions in actual use. The "top surface" of a component or a member means the uppermost surface of the component or the member.

In this specification and the drawings, an x-axis, a y-axis, and a z-axis represent three axes of a three-dimensional Cartesian coordinate system. When the module substrate is a rectangle when viewed in plan, the x-axis and the y-axis are directions parallel to a first side of the rectangle and a second side orthogonal to the first side, respectively. The z-axis is a thickness direction of the module substrate. In this specification, the "thickness direction" of the module substrate refers to a direction perpendicular to a principal surface of the module substrate.

In this specification, "connected" includes not only when directly connected by a connection terminal and/or a wiring conductor, but also when electrically connected via another circuit element. In addition, "connected between A and B" means connected to both A and B between A and B.

In the component arrangement in the present disclosure, "the module substrate is viewed in plan" is synonymous with "the principal surface of the module substrate is viewed in plan", and means that an object is orthographically projected onto an xy plane from a positive side of the z-axis. In this specification, unless otherwise specified, "viewed in plan" means "the principal surface of the module substrate is viewed in plan". In this specification, a side on which a first component is provided with respect to a module substrate is referred to as "upper (or upper side)", and a direction opposite thereto is referred to as "lower (or lower side)".

"The component is disposed on a principal surface side of the substrate" includes "the component is disposed on the principal surface of the substrate in contact with the principal surface" as well as "the component is disposed above the principal surface without being in contact with the principal surface" and "the component is partially embedded in the substrate from the principal surface side". Further, "A is disposed between B and C" means that at least one of multiple line segments connecting points in B and points in C passes through A.

In this specification, ordinal numbers such as "first" and "second" do not mean the number or order of constituent elements unless otherwise specified, and are used to distinguish constituent elements from the constituent elements of the same type so that they are not confused.

Embodiment

1. Circuit Configurations of Radio Frequency Module and Communication Device

Circuit configurations of the radio frequency module and the communication device according to Embodiment will be described with reference to FIG. 1. FIG. 1 is a circuit configuration diagram of a radio frequency module 1 and a communication device 5 according to the present embodiment.

1-1. Circuit Configuration of Communication Device

First, the circuit configuration of the communication device 5 will be described. The communication device 5 is a device used in a communication system and is, for example, a mobile terminal such as a smartphone or a tablet computer. As illustrated in FIG. 1, the communication device 5 according to the present embodiment includes the radio frequency module 1, an antenna 2, an RF signal processing circuit (RFIC) 3, and a baseband signal processing circuit (BBIC) 4.

The radio frequency module 1 transmits radio frequency signals between the antenna 2 and the RFIC 3. An internal configuration of the radio frequency module 1 will be described later.

The antenna 2 is connected to an antenna connection terminal 100 of the radio frequency module 1, transmits a radio frequency signal (transmitting signal) outputted from the radio frequency module 1, and also receives a radio frequency signal (receiving signal) from the outside and outputs the radio frequency signal to the radio frequency module 1.

The RFIC 3 is an example of a signal processing circuit that processes radio frequency signals transmitted and received by the antenna 2. To be specific, the RFIC 3 processes a radio frequency receiving signal inputted via a receive path of the radio frequency module 1 by down-conversion or the like, and outputs a receiving signal generated by the signal processing to the BBIC 4. In addition, the RFIC 3 processes a transmitting signal inputted from the BBIC 4 by up-conversion or the like, and outputs a radio frequency transmitting signal generated by the signal processing to a transmit path of the radio frequency module 1. Further, the RFIC 3 includes a control section that controls switches, amplifiers, and the like of the radio frequency module 1. Note that some or all of the functions of the RFIC 3 as the control section may be implemented outside the RFIC 3, for example, in the BBIC 4 or the radio frequency module 1.

The BBIC 4 is a baseband signal processing circuit that processes signals using an intermediate frequency band for frequencies lower than the frequency of the radio frequency signals transmitted by the radio frequency module 1. Signals to be processed by the BBIC 4 are, for example, image signals for displaying images and/or audio signals for calling through a speaker.

In the communication device 5 according to the present embodiment, the antenna 2 and the BBIC 4 are not essential constituent elements.

1-2. Circuit Configuration of Radio Frequency Module

Next, a circuit configuration of the radio frequency module 1 will be described. As illustrated in FIG. 1, the radio frequency module 1 includes a power amplifier 10, a PA control circuit 11, a low noise amplifier 20, matching circuits 31, 32, 41, and 42, switches 51 to 53, duplexers 61 and 62, the antenna connection terminal 100, a radio frequency input terminal 110, a control input terminal 111, and a radio frequency output terminal 120.

The antenna connection terminal 100 is connected to the antenna 2.

The radio frequency input terminal 110 is a terminal for receiving a radio frequency transmitting signal from the outside of the radio frequency module 1. In the present embodiment, the radio frequency input terminal 110 is a terminal for receiving transmitting signals in communication bands A and B from the RFIC 3.

The control input terminal 111 is a terminal for receiving a digital signal for controlling a gain of the power amplifier 10, and a power supply voltage and a bias voltage supplied to the power amplifier 10. For example, the control input terminal 111 is a terminal compatible with a Mobile Industry Processor Interface (MIPI) and receives a digital signal from the RFIC 3.

The radio frequency output terminal 120 is a terminal for providing radio frequency receiving signals to the outside of the radio frequency module 1. In the present embodiment, the radio frequency output terminal 120 is a terminal for providing receiving signals in the communication bands A and B to the RFIC 3.

The communication band means a frequency band predefined by, for example, a standardization organization (e.g., 3rd Generation Partnership Project (3GPP) and Institute of Electrical and Electronics Engineers (IEEE)) for a communication system. Here, the communication system means a communication system constructed by using a radio access technology (RAT). As the communication system, for example, a 5th Generation New Radio (5G NR) system, a Long Term Evolution (LTE) system, and a Wireless Local Area Network (WLAN) system can be used, but the communication system is not limited thereto.

The communication bands A and B are communication bands different from each other. In the present embodiment, communication bands for Frequency Division Duplex (FDD) are used as the communication bands A and B. As at least one of the communication bands A and B, a communication band for Time Division duplex (TDD) may be used.

The radio frequency module 1 is provided with the transmit path for transmitting a transmitting signal and the receive path for transmitting a receiving signal. Specifically, as illustrated in FIG. 1, transmit paths AT and BT and receive paths AR and BR are provided.

The transmit path AT is a path through which transmitting signals in the communication band A are transmitted, and is a path of the two signal paths connecting the radio frequency input terminal 110 and the antenna connection terminal 100, in which the power amplifier 10, the switch 52, the matching circuit 31, a transmit filter 61T, and the switch 51 are arranged. The transmit path BT is a path through which transmitting signals in the communication band B are transmitted, and is a path of the two signal paths connecting the radio frequency input terminal 110 and the antenna connection terminal 100, in which the power amplifier 10, the switch 52, the matching circuit 32, a transmit filter 62T, and the switch 51 are arranged. The transmit paths AT and BT are unified between the radio frequency input terminal 110 and the switch 52 and between the switch 51 and the antenna connection terminal 100.

The receive path AR is a path through which receiving signals in the communication band A are transmitted. The receive path AR is a path of the two signal paths connecting the antenna connection terminal 100 and the radio frequency output terminal 120, in which the switch 51, a receive filter 61R, the matching circuit 41, the switch 53, and the low noise amplifier 20 are arranged. The receive path BR is a path through which receiving signals in the communication band B are transmitted, and is a path of the two signal paths connecting the antenna connection terminal 100 and the radio frequency output terminal 120, in which the switch 51, a receive filter 62R, the matching circuit 42, the switch 53, and the low noise amplifier 20 are arranged. The receive paths AR and BR are unified between the antenna connection terminal 100 and the switch 51 and between the switch 53 and the radio frequency output terminal 120. The path between the antenna connection terminal 100 and the switch 51 is a path common to the transmit path and the receive path, and is also referred to as a transmit/receive path that transmits both the transmitting signal and the receiving signal.

The power amplifier 10 can amplify transmitting signals in the communication bands A and B. Here, an input terminal of the power amplifier 10 is connected to the radio frequency input terminal 110, and an output terminal of the power amplifier 10 is connected to the switch 52.

A configuration of the power amplifier 10 is not limited to a specific configuration. For example, the power amplifier 10 may have a single-stage configuration or a multi-stage configuration. For example, the power amplifier 10 may include multiple cascade-connected amplifying elements. The power amplifier 10 may convert a radio frequency signal into balanced signals and amplify the balanced signals. Such a power amplifier 10 is sometimes referred to as a differential amplifier. The "balanced signals" mean a pair of signals having phases opposite to each other. The "balanced signals" are sometimes referred to as differential signals.

The PA control circuit 11 is an example of a control circuit that controls the power amplifier 10. The PA control circuit 11 controls the gain of the power amplifier 10 based on the digital signal inputted via the control input terminal 111.

The PA control circuit 11 is, for example, one semiconductor integrated circuit. The semiconductor integrated circuit is configured using a Complementary Metal Oxide Semiconductor (CMOS), for example, and is specifically fabricated using a Silicon on Insulator (SOI) process. Thus, the semiconductor integrated circuit can be manufactured at low costs. At least one of GaAs, SiGe, and GaN may be used as a material for the semiconductor integrated circuit.

The low noise amplifier 20 can amplify receiving signals in the communication bands A and B received by the antenna connection terminal 100. Here, an input terminal of the low noise amplifier 20 is connected to the switch 53, and an output terminal of the low noise amplifier 20 is connected to the radio frequency output terminal 120.

A configuration of the low noise amplifier 20 is not limited to a specific configuration. For example, the low noise amplifier 20 may have a single-stage configuration or a multi-stage configuration.

Each of the power amplifier 10 and the low noise amplifier 20 is configured using, for example, a Si-based CMOS or a GaAs field-effect transistor (FET) or a GaAs heterojunction bipolar transistor (HBT).

The duplexer 61 is an example of a filter having a pass band including the communication band A. The duplexer 61 passes radio frequency signals in the communication band A. The duplexer 61 transmits a transmitting signal and a receiving signal in the communication band A by the FDD system. The duplexer 61 includes the transmit filter 61T and the receive filter 61R.

The transmit filter 61T is an example of a first transmit filter and has a pass band that includes an uplink operating band in the communication band A. One end of the transmit filter 61T is connected to the antenna connection terminal 100 via the switch 51. The other end of the transmit filter 61T is connected to the output terminal of the power amplifier 10 via the matching circuit 31 and the switch 52.

The "uplink operating band" refers to part of a communication band designated for an uplink. For the radio frequency module 1, the uplink operating band means a transmission band.

The receive filter 61R has a pass band that includes a downlink operating band in the communication band A. One end of the receive filter 61R is connected to the antenna connection terminal 100 via the switch 51. The other end of the receive filter 61R is connected to the input terminal of the low noise amplifier 20 via the matching circuit 41 and the switch 53.

The "downlink operating band" refers to part of a communication band designated for a downlink. For the radio frequency module 1, the downlink operating band means a reception band.

The duplexer 62 is an example of a filter having a pass band including the communication band B. The duplexer 62 passes radio frequency signals in the communication band B. The duplexer 62 transmits a transmitting signal and a receiving signal in the communication band B by the FDD system. The duplexer 62 includes the transmit filter 62T and the receive filter 62R.

The transmit filter 62T is an example of a second transmit filter having a pass band different from that of the first transmit filter. The pass band includes an uplink operating band in the communication band B. One end of the transmit filter 62T is connected to the antenna connection terminal 100 via the switch 51. The other end of the transmit filter 62T is connected to the output terminal of the power amplifier 10 via the matching circuit 32 and the switch 52.

The receive filter 62R has a pass band that includes a downlink operating band in the communication band B. One end of the receive filter 62R is connected to the antenna connection terminal 100 via the switch 51. The other end of the receive filter 62R is connected to the input terminal of the low noise amplifier 20 via the matching circuit 42 and the switch 53.

Each of the transmit filters 61T and 62T and the receive filters 61R and 62R is, for example, any one of an acoustic wave filter using Surface Acoustic Waves (SAW), an acoustic wave filter using Bulk Acoustic Waves (BAW), an LC resonance filter, and a dielectric filter, but is not limited thereto.

The switch 51 is connected between the antenna connection terminal 100 and each of the duplexers 61 and 62. The switch 51 is also referred to as an antenna switch. To be specific, the switch 51 includes terminals 511 to 513. The terminal 511 is a common terminal connected to the antenna connection terminal 100. The terminal 512 is a selection terminal connected to the transmit filter 61T and the receive filter 61R. The terminal 513 is a selection terminal connected to the transmit filter 62T and the receive filter 62R.

The switch 51 can connect one of the terminal 512 and the terminal 513 to the terminal 511 based on, for example, a control signal from the RFIC 3. Thus, the switch 51 switches between (a) the connection between the antenna connection terminal 100 and both the transmit filter 61T and the receive filter 61R and (b) the connection between the antenna connection terminal 100 and both the transmit filter 62T and the receive filter 62R. The switch 51 is, for example, a single-pole double-throw (SPDT) switch circuit. Note that the switch 51 may be a multi-connection switch circuit capable of simultaneously performing the connections (a) and (b).

The switch 52 is connected between each of the duplexers 61 and 62 and the power amplifier 10. To be specific, the switch 52 includes terminals 521 to 523. The terminal 521 is a common terminal connected to the output terminal of the power amplifier 10. The terminal 522 is a selection terminal connected to the transmit filter 61T via the matching circuit 31. The terminal 523 is a selection terminal connected to the transmit filter 62T via the matching circuit 32.

The switch 52 can connect one of the terminal 522 and the terminal 523 to the terminal 521 based on, for example, a control signal from the RFIC 3. Thus, the switch 52 switches between the connection between the power amplifier 10 and the transmit filter 61T and the connection between the power amplifier 10 and the transmit filter 62T. The switch 52 is, for example, an SPDT switch circuit.

The switch 53 is connected between each of the duplexers 61 and 62 and the low noise amplifier 20. To be specific, the switch 53 includes terminals 531 to 533. The terminal 531 is a common terminal connected to the input terminal of the low noise amplifier 20. The terminal 532 is a selection terminal connected to the receive filter 61R via the matching circuit 41. The terminal 533 is a selection terminal connected to the receive filter 62R via the matching circuit 42.

The switch 53 can connect one of the terminal 532 and the terminal 533 to the terminal 531 based on, for example, a control signal from the RFIC 3. Thus, the switch 53 switches between the connection between the low noise amplifier 20 and the receive filter 61R and the connection between the low noise amplifier 20 and the receive filter 62R. The switch 53 is, for example, an SPDT switch circuit.

The matching circuit 31 is connected between the transmit filter 61T and the output terminal of the power amplifier 10. To be specific, the matching circuit 31 is connected between the transmit filter 61T and the terminal 522 of the switch 52. The matching circuit 31 matches the impedance between the transmit filter 61T and the power amplifier 10.

The matching circuit 32 is connected between the transmit filter 62T and the output terminal of the power amplifier 10. To be specific, the matching circuit 32 is connected between the transmit filter 62T and the terminal 523 of the switch 52. The matching circuit 32 matches the impedance between the transmit filter 62T and the power amplifier 10.

The matching circuit 41 is connected between the receive filter 61R and the input terminal of the low noise amplifier 20. To be specific, the matching circuit 41 is connected between the receive filter 61R and the terminal 532 of the switch 53. The matching circuit 41 matches the impedance between the receive filter 61R and the low noise amplifier 20.

The matching circuit 42 is connected between the receive filter 62R and the input terminal of the low noise amplifier 20. To be specific, the matching circuit 42 is connected between the receive filter 62R and the terminal 533 of the switch 53. The matching circuit 42 matches the impedance between the receive filter 62R and the low noise amplifier 20.

Each of the matching circuits 31, 32, 41, and 42 is formed using at least one of an inductor, a capacitor, and a resistor. For example, each of the matching circuits 31, 32, 41, and 42 includes a chip inductor.

In place of or in addition to the matching circuits 31 and 32, a matching circuit may be provided between the terminal 521 of the switch 52 and the output terminal of the power amplifier 10. In place of or in addition to the matching circuits 41 and 42, a matching circuit may be provided between the terminal 531 of the switch 53 and the input terminal of the low noise amplifier 20. A matching circuit may be provided between the terminal 512 of the switch 51 and the duplexer 61. A matching circuit may be provided between the terminal 513 of the switch 51 and the duplexer 62.

In the radio frequency module 1 having the above circuit configuration, the power amplifier 10, the switch 52, the matching circuit 31, and the transmit filter 61T constitute a first transmission circuit that outputs a transmitting signal in the communication band A to the antenna connection terminal 100. The power amplifier 10, the switch 52, the matching circuit 32, and the transmit filter 62T constitute a second transmission circuit that outputs a transmitting signal in the communication band B to the antenna connection terminal 100.

The low noise amplifier 20, the switch 53, the matching circuit 41, and the receive filter 61R constitute a first reception circuit that receives a receiving signal in the communication band A from the antenna 2 via the antenna connection terminal 100. The low noise amplifier 20, the switch 53, the matching circuit 42, and the receive filter 62R constitute a second reception circuit that receives a receiving signal in the communication band B from the antenna 2 via the antenna connection terminal 100.

According to the above circuit configuration, the radio frequency module 1 according to the present embodiment can perform at least one of (1) transmission and reception of radio frequency signals in the communication band A, (2) transmission and reception of radio frequency signals in the communication band B, and (3) simultaneous transmission, simultaneous reception, or simultaneous transmission and reception of radio frequency signals in the communication band A and radio frequency signals in the communication band B.

In the radio frequency module 1 according to the present embodiment, the transmission circuit and the reception circuit do not necessarily have to be connected to the antenna connection terminal 100 via the switch 51, and the transmission circuit and the reception circuit may be connected to the antenna 2 via different terminals.

Some of the circuit elements illustrated in FIG. 1 do not necessarily have to be included in the radio frequency module 1. For example, the radio frequency module 1 may include only transmission circuits that transmit the transmitting signals. In this case, the radio frequency module 1 does not have to include the low noise amplifier 20, the matching circuits 41 and 42, the switch 53, and the receive filters 61R and 62R. The radio frequency module 1 may include only reception circuits that transmit the receiving signals. In this case, the radio frequency module 1 does not have to include the power amplifier 10, the matching circuits 31 and 32, the switch 52, and the transmit filters 61T and 62T. The radio frequency module 1 may transmit radio frequency signals in only one communication band. In this case, the radio frequency module 1 does not have to include the switch 51, the matching circuits 32 and 42, and the duplexer 62.

2. Component Arrangement in Radio Frequency Module

Next, an example of component arrangement in the radio frequency module 1 will be described with reference to FIGS. 2 to 4.

Figure 2:
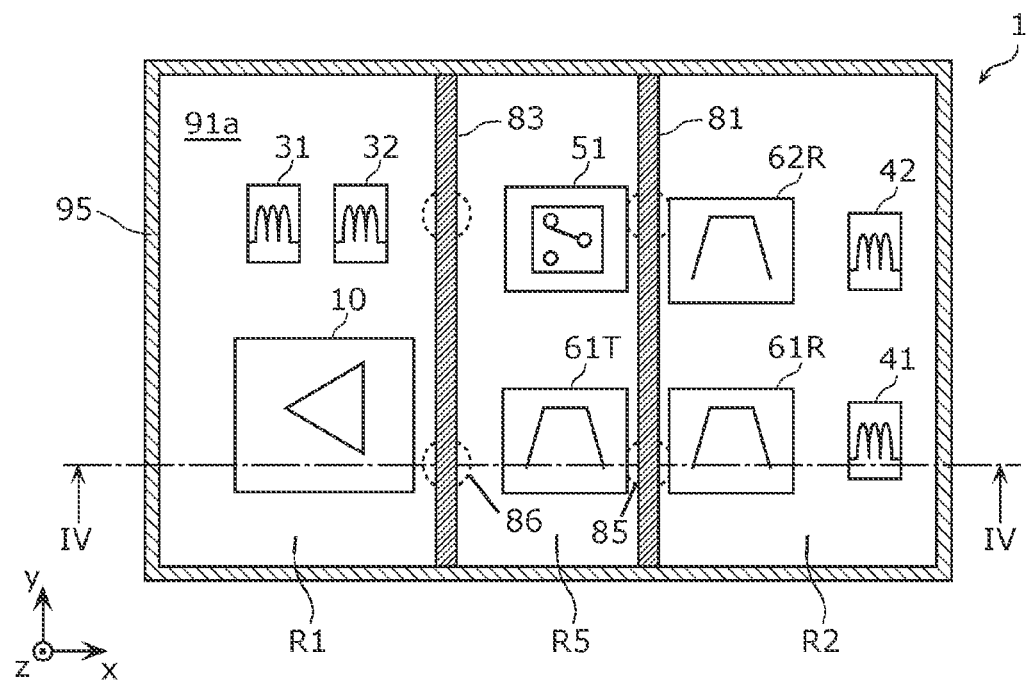
FIG. 2 is a plan view of the radio frequency module according to Embodiment.
Figure 3:
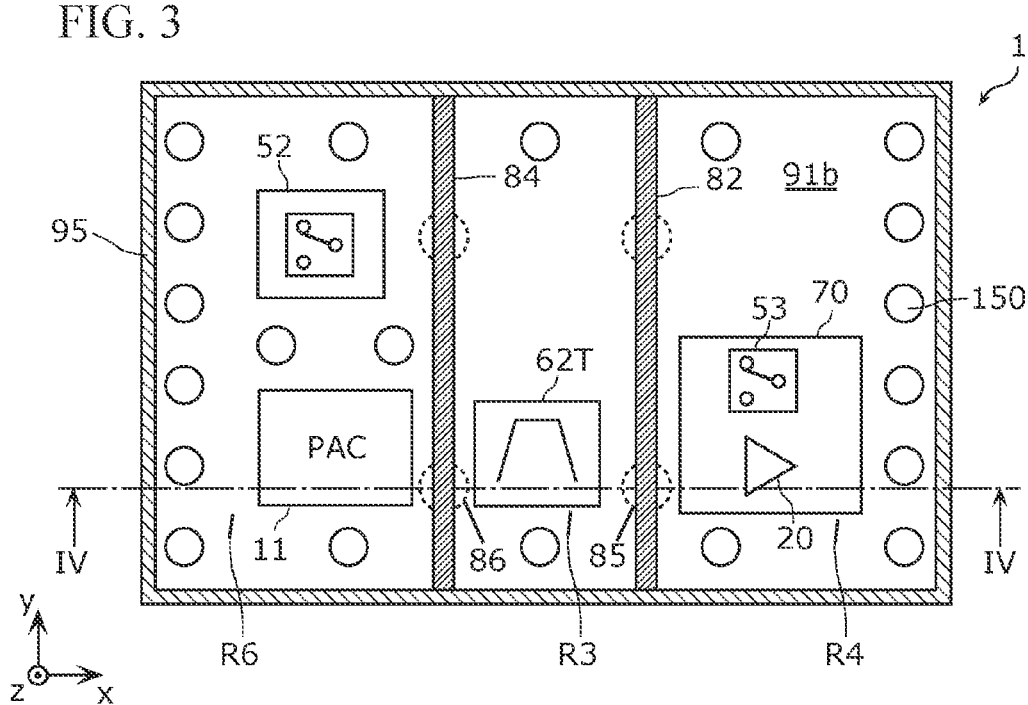
FIG. 3 is a plan view of the radio frequency module according to Embodiment.

FIGS. 2 and 3 are plan views of the radio frequency module 1 according to the present embodiment. FIG. 2 illustrates the arrangement of components and members arranged on a principal surface 91a side when the principal surface 91a of the module substrate 91 is viewed from a positive side of the z-axis. FIG. 3 illustrates the arrangement of components and members arranged on a principal surface 91b side when the principal surface 91b of the module substrate 91 is viewed from the positive side of the z-axis. Since the principal surface 91b faces a negative side of the z-axis, FIG. 3 is a plan view of the components and members disposed on the principal surface 91b side of the module substrate 91 as seen through the module substrate 91.

Figure 4:
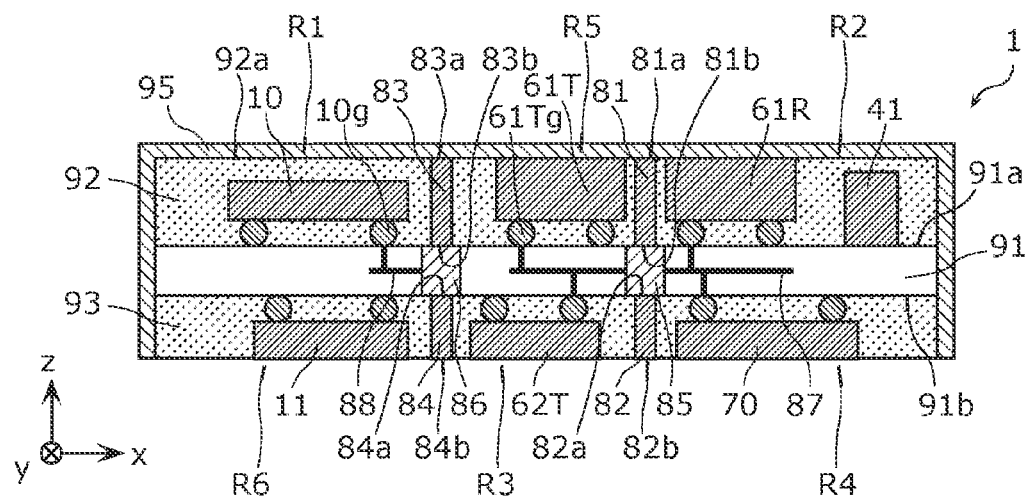
FIG. 4 is a sectional view of the radio frequency module according to Embodiment.

FIG. 4 is a sectional view of the radio frequency module 1 according to the present embodiment. FIG. 4 illustrates a cross section (xz plane) taken along line IV-IV in FIGS. 2 and 3. In FIG. 4, a cross section of the module substrate 91 is not hatched for the sake of clarity.

As illustrated in FIGS. 2 to 4, the radio frequency module 1 includes, in addition to the circuit configuration illustrated in FIG. 1, the module substrate 91, resin members 92 and 93, and a metal shield layer 95. The radio frequency module 1 also includes metal shield walls 81 to 84, via conductors 85 and 86, and metal conductors 87 and 88.

The module substrate 91 has the principal surface 91a and the principal surface 91b opposite to the principal surface 91a. Although the module substrate 91 has a rectangular shape when viewed in plan, the shape of the module substrate 91 is not limited thereto. As the module substrate 91, for example, a low temperature co-fired ceramics (LTCC) substrate, a high temperature co-fired ceramics (HTCC) substrate, a component-embedded substrate, a substrate having a redistribution layer (RDL), a printed substrate, or the like can be used, the above-described substrates having a layered structure of a plurality of dielectric layers, but the module substrate 91 is not limited thereto.

The principal surface 91a is an example of a first principal surface and may be referred to as an upper surface or a front surface. On the principal surface 91a side, a plurality of components each including elements included in the circuit illustrated in FIG. 1 is disposed. To be specific, as illustrated in FIG. 2, the power amplifier 10, the matching circuits 31, 32, 41, and 42, the switch 51, the transmit filter 61T, and the receive filters 61R and 62R are arranged on the principal surface 91a side. The metal shield walls 81 and 83 are arranged (to be specific, they are upright) on the principal surface 91a side.

The principal surface 91b is an example of a second principal surface and may be referred to as a lower surface or a rear surface. On the principal surface 91b side, a plurality of components each including elements included in the circuit illustrated in FIG. 1 and a plurality of external connection terminals are arranged. To be specific, as illustrated in FIG. 3, the PA control circuit 11, the low noise amplifier 20, the switches 52 and 53, the transmit filter 62T, and a plurality of external connection terminals 150 are arranged on the principal surface 91b side. The metal shield walls 82 and 84 are arranged (to be specific, they are upright) on the principal surface 91b side.

The low noise amplifier 20 and the switch 53 are included in one semiconductor integrated circuit 70. The semiconductor integrated circuit 70 is an electronic component having electronic circuits formed on a surface and inside of a semiconductor chip (also referred to as a die). The semiconductor integrated circuit 70 is constituted using a CMOS, for example, and is specifically fabricated using an SOI process. Thus, the semiconductor integrated circuit 70 can be manufactured at low costs. At least one of GaAs, SiGe, and GaN is used as a material for the semiconductor integrated circuit 70. Thus, the semiconductor integrated circuit 70 having high quality can be obtained. The low noise amplifier 20 and the switch 53 may be arranged on the principal surface 91b side as separate circuit components.

The plurality of external connection terminals 150 includes ground terminals in addition to the antenna connection terminal 100, the radio frequency input terminal 110, the control input terminal 111, and the radio frequency output terminal 120 illustrated in FIG. 1. Each of the plurality of external connection terminals 150 is connected to, for example, an input/output terminal and/or a ground terminal on a motherboard (not illustrated) disposed on a negative side of the z-axis of the radio frequency module 1. Each of the plurality of external connection terminals 150 is a post electrode penetrating the resin member 93 covering the principal surface 91b.

The resin member 92 is an example of a sealing member, and is disposed on the principal surface 91a of the module substrate 91 to cover the principal surface 91a. To be specific, the resin member 92 is provided so as to cover side surfaces and upper surfaces of the components and side surfaces of the metal shield walls 81 and 83 arranged on the principal surface 91a side. The resin member 92 does not have to cover the upper surfaces of the components arranged on the principal surface 91a side. For example, as illustrated in FIG. 4, the resin member 92 does not cover the respective upper surfaces of the transmit filter 61T and the receive filter 61R.

The resin member 93 is an example of a sealing member, and is disposed on the principal surface 91b of the module substrate 91 to cover the principal surface 91b. To be specific, the resin member 93 is provided so as to cover side surfaces of the components and side surfaces of the metal shield walls 82 and 84 arranged on the principal surface 91b side. The resin member 93 may cover lower surfaces (surfaces on the negative side of the z-axis) of the components arranged on the principal surface 91b side.

The metal shield layer 95 is an example of a metal layer and covers an upper surface 92a of the resin member 92. The upper surface 92a is a surface of the resin member 92 opposite to the side of the module substrate 91. To be specific, the metal shield layer 95 covers the upper surface 92a and side surfaces of the resin member 92, side surfaces of the module substrate 91, and side surfaces of the resin member 93. Note that "cover a surface" means to cover at least part of the surface. Therefore, for example, the metal shield layer 95 may cover only a portion of the upper surface 92a of the resin member 92 and need not necessarily cover the remaining portion. The same applies to a case where another member such as the resin member 92 "covers a surface".

In addition, the metal shield layer 95 covers upper surfaces of the components whose upper surfaces are not covered with the resin member 92 among the components arranged on the principal surface 91a side of the module substrate 91. For example, as illustrated in FIG. 4, the metal shield layer 95 is in contact with the respective upper surfaces of the transmit filter 61T and the receive filter 61R. An upper surface of the power amplifier 10 does not necessarily be covered with the resin member 92. The metal shield layer 95 may be in contact with the upper surface of the power amplifier 10.

Thus, the heat generated in the power amplifier 10, the transmit filter 61T, and the receive filter 61R can be dissipated to the metal shield layer 95. Further, the heat conducted in the metal shield layer 95 can be dissipated to the motherboard through the metal shield walls 81 to 84 and the via conductors 85 and 86, which will be described later. The power amplifier 10, the transmit filter 61T or the receive filter 61R, or other components may be in contact with a side surface portion of the metal shield layer 95 in addition to or instead of an upper surface portion of the metal shield layer 95. The larger the contact area with the metal shield layer 95 is, the better the heat dissipation is.

The metal shield layer 95 is, for example, a metal thin film formed by sputtering. The metal shield layer 95 is set to ground potential. To be specific, the metal shield layer 95 is set to the ground potential by being connected to the ground terminals and a ground electrode provided in or on the module substrate 91. This reduces intrusion of external noise into the circuit components included in the radio frequency module 1.

3. Structure for Reducing Electromagnetic Field Coupling

Here, in the radio frequency module 1 having the above circuit configuration, when at least two of the elements (for example, inductors and/or capacitors) arranged in the transmit paths AT and BT and the receive paths AR and BR are electromagnetically coupled, harmonic components of a high-output transmitting signal amplified by the power amplifier 10 may be superimposed on the transmitting signal and the quality of the transmitting signal may be degraded. In addition, the electromagnetic field coupling reduces the isolation between the transmission and the reception, and unwanted waves such as the harmonic components or intermodulation distortion between the transmitting signal and another radio frequency signal may flow into the receive path, degrading the reception sensitivity.

In contrast, the radio frequency module 1 according to the present embodiment has a configuration to reduce the electromagnetic field coupling between components. To be specific, the radio frequency module 1 includes the metal shield walls 81 and 82, the via conductor 85, and a metal conductor 87. The metal shield walls 81 and 82 and the via conductor 85 are connected and aligned in a straight line in a thickness direction of the module substrate 91 to form a first connection structure. The radio frequency module 1 further includes the metal shield walls 83 and 84, the via conductor 86, and a metal conductor 88. The metal shield walls 83 and 84 and the via conductor 86 are connected and aligned in a straight line in the thickness direction of the module substrate 91 to form a second connection structure.

A component mounting region (the principal surfaces 91a and 91b) in the radio frequency module 1 can be divided into six regions R1 to R6 by the module substrate 91 (the metal conductors 87 and 88), the metal shield walls 81 to 84, and the via conductors 85 and 86. As illustrated in FIG. 2, the regions R1, R5, and R2 are regions on the principal surface 91a. As illustrated in FIG. 3, the regions R6, R3, and R4 are regions on the principal surface 91b. When the radio frequency module 1 is viewed in plan, the region R1 and the region R6 overlap each other. When the radio frequency module 1 is viewed in plan, the region R5 and the region R3 overlap each other. When the radio frequency module 1 is viewed in plan, the region R2 and the region R4 overlap each other.

To be specific, the region R1 is a region on a negative side of the x-axis with respect to the metal shield wall 83, and a first component is disposed therein. The first component is specifically the matching circuit 31 or 32 or the power amplifier 10. The region R2 is a region on a positive side of the x-axis with respect to the metal shield wall 81, and a second component is disposed therein. The second component is specifically the matching circuit 41 or 42 or the receive filter 61R or 62R. The region R5 is a region between the metal shield wall 83 and the metal shield wall 81, and a fifth component is disposed therein. The fifth component is specifically the switch 51 or the transmit filter 61T.

The region R6 is a region on a negative side of the x-axis with respect to the metal shield wall 84, and a sixth component is disposed therein. The sixth component is specifically the PA control circuit 11 or the switch 52. The region R4 is a region on a positive side of the x-axis with respect to the metal shield wall 82, and a fourth component is disposed therein. The fourth component is specifically the low noise amplifier 20 or the switch 53. The region R3 is a region between the metal shield wall 84 and the metal shield wall 82, and a third component is disposed therein. The third component is specifically the transmit filter 62T.

With this configuration, the electromagnetic field coupling between the respective components in any two of the six regions R1 to R6 can be reduced. For example, the region R1 and the region R2 are separated by the two metal shield walls 81 and 83, thereby more strongly reducing the electromagnetic field coupling. The region R1 and the region R4 are separated by the two connection structures (each of which includes the two metal shield walls and the via conductor) and the module substrate 91, thereby further strongly reducing the electromagnetic field coupling.

The radio frequency module 1 does not have to include the metal shield walls 83 and 84, the via conductor 86, and the metal conductor 88. In this case, the fifth component is regarded as the first component because the region R1 and the region R5 are not divided. The sixth component is regarded as the third component because the region R3 and the region R6 are not divided.

Similarly, the radio frequency module 1 does not have to include the metal shield walls 81 and 82, the via conductor 85, and the metal conductor 87. In this case, the fifth component is regarded as the second component because the region R5 and the region R2 are not divided. The fourth component is regarded as the third component because the region R3 and the region R4 are not divided.

Hereinafter, the details of the metal shield walls 81 to 84, the via conductors 85 and 86, and the metal conductors 87 and 88 will be described.

The metal shield wall 81 is an example of a first metal wall, and is disposed on the principal surface 91a side of the module substrate 91. The metal shield wall 81 is disposed between the first component and a second component when viewed in plan. In the present embodiment, the principal surface 91a is divided into the regions R1 and R5 and the region R2 by the metal shield wall 81.

As illustrated in FIG. 4, an upper end 81a of the metal shield wall 81 is in contact with the metal shield layer 95. The metal shield wall 81 is electrically connected to the metal shield layer 95 and set to the ground potential, by being in contact with the metal shield layer 95. Thus, the metal shield wall 81 can reduce the electromagnetic field coupling between components located on both sides of the metal shield wall 81. That is, the metal shield wall 81 has a shielding function (electromagnetic shielding function).

In the present embodiment, a lower end 81b of the metal shield wall 81 is in contact with the via conductor 85. The via conductor 85 is connected to a ground terminal (not illustrated) through the metal conductor 87, and is set to the ground potential. This supplies the ground potential to the metal shield wall 81 from both the upper end 81a and the lower end 81b, thus strengthening the grounding of the metal shield wall 81 and enhancing the shielding function of the metal shield wall 81.

The metal shield wall 82 is an example of a first metal member, and is disposed on the principal surface 91b side of the module substrate 91. The metal shield wall 82 is disposed between the third component and the fourth component when viewed in plan. In the present embodiment, the principal surface 91b is divided into the regions R3 and R6 and the region R4 by the metal shield wall 82.

An upper end 82a of the metal shield wall 82 is in contact with the via conductor 85. The metal shield wall 82 is electrically connected to the via conductor 85 and set to the ground potential, by being in contact with the via conductor 85. Thus, the metal shield wall 82 can reduce the electromagnetic field coupling between components located on both sides of the metal shield wall 82.

In the present embodiment, a lower end 82b of the metal shield wall 82 is exposed without being covered with the resin member 93. The lower end 82b of the metal shield wall 82 may be connected to a ground terminal on a motherboard (not illustrated) disposed on the negative side of the z-axis of the radio frequency module 1. This strengthens the grounding of the metal shield wall 82 and enhances the shielding function thereof.

The via conductor 85 is an example of a first via conductor and penetrates the module substrate 91. The via conductor 85 is connected to the ground terminal (not illustrated) through the metal conductor 87. Thus, the via conductor 85 and the metal conductor 87 are set to the ground potential.

The via conductor 85 electrically connects the metal shield wall 81 and the metal shield wall 82. The via conductor 85 at least partially overlaps each of the metal shield walls 81 and 82 when viewed in plan.

The via conductor 85 is, for example, a columnar metal conductor, and a width (diameter) thereof is longer than a width (length along the y-axis) of each of the metal shield walls 81 and 82. In the radio frequency module 1, two or more via conductors 85 are provided side by side along the y-axis. The number, shape, size, and the like of the via conductors 85 are not limited.

In the present embodiment, as illustrated in FIG. 4, at least part of an overlap of the metal shield wall 81 and the via conductor 85 when viewed in plan overlaps the metal shield wall 82 when viewed in plan. That is, the metal shield wall 81, the via conductor 85, and the metal shield wall 82 are connected and aligned in a straight line in the thickness direction of the module substrate 91. Thus, the electromagnetic field coupling between the components can be reduced more strongly.

For example, the connection structure of the metal shield wall 81, the via conductor 85, and the metal shield wall 82 can reduce the electromagnetic field coupling between the first component and the fifth component (the power amplifier 10 or the matching circuit 31 or 32 and the switch 51 or the transmit filter 61T) arranged on the principal surface 91a side and the fourth component (the low noise amplifier 20 or the switch 53) disposed on the principal surface 91b side. Further, the above connection structure can reduce the electromagnetic field coupling between the second component (the matching circuit 41 or 42 or the receive filter 61R or 62R) disposed on the principal surface 91a side and the third component and the sixth component (the transmit filter 62T and the PA control circuit 11 or the switch 52) arranged on the principal surface 91b side.

The metal shield wall 83 is an example of a third metal wall, and is disposed on the principal surface 91a side of the module substrate 91. The metal shield wall 83 is disposed between the first component and the fifth component when viewed in plan. In the present embodiment, the principal surface 91a is divided into the region R1 and the regions R5 and R2 by the metal shield wall 83.

As illustrated in FIG. 4, an upper end 83a of the metal shield wall 83 is in contact with the metal shield layer 95. The metal shield wall 83 is electrically connected to the metal shield layer 95 and set to the ground potential, by being in contact with the metal shield layer 95. Thus, the metal shield wall 83 can reduce the electromagnetic field coupling between components located on both sides of the metal shield wall 83. That is, the metal shield wall 83 has a shielding function.

In the present embodiment, a lower end 83b of the metal shield wall 83 is in contact with the via conductor 86. The via conductor 86 is connected to a ground terminal (not illustrated) through the metal conductor 88, and is set to the ground potential. This supplies the ground potential to the metal shield wall 83 from both the upper end 83a and the lower end 83b, thus strengthening the grounding of the metal shield wall 83 and enhancing the shielding function of the metal shield wall 83.

The metal shield wall 84 is an example of a second metal member, and is disposed on the principal surface 91b side of the module substrate 91. The metal shield wall 84 is disposed between the sixth component and the third component when viewed in plan. In the present embodiment, the principal surface 91b is divided into the region R6 and the regions R3 and R4 by the metal shield wall 84.

An upper end 84a of the metal shield wall 84 is in contact with the via conductor 86. The metal shield wall 84 is electrically connected to the via conductor 86 and set to the ground potential, by being in contact with the via conductor 86. Thus, the metal shield wall 84 can reduce the electromagnetic field coupling between components located on both sides of the metal shield wall 84.

In the present embodiment, a lower end 84b of the metal shield wall 84 is exposed without being covered with the resin member 93. The lower end 84b of the metal shield wall 84 may be connected to a ground terminal on the motherboard (not illustrated) disposed on the negative side of the z-axis of the radio frequency module 1. This strengthens the grounding of the metal shield wall 84 and enhances the shielding function thereof.

The via conductor 86 is an example of a second via conductor and penetrates the module substrate 91. The via conductor 86 is connected to a ground terminal (not illustrated) through the metal conductor 88. Thus, the via conductor 86 and the metal conductor 88 are set to the ground potential.

The via conductor 86 electrically connects the metal shield wall 83 and the metal shield wall 84. The via conductor 86 at least partially overlaps each of the metal shield walls 83 and 84 when viewed in plan.

The via conductor 86 is, for example, a columnar metal conductor, and a width (diameter) thereof is longer than a width (length along the y-axis) of each of the metal shield walls 83 and 84. In the radio frequency module 1, two or more via conductors 86 are provided side by side along the y-axis. The number, shape, size, and the like of the via conductors 86 are not limited.

In the present embodiment, as illustrated in FIG. 4, at least part of an overlap of the metal shield wall 83 and the via conductor 86 when viewed in plan overlaps the metal shield wall 84 when viewed in plan. That is, the metal shield wall 83, the via conductor 86, and the metal shield wall 84 are connected and aligned in a straight line in the thickness direction of the module substrate 91. Thus, the electromagnetic field coupling between the components can be reduced more strongly.

Any one of the first component, the second component, the third component, the fourth component, the fifth component, and the sixth component includes a ground terminal. For example, as illustrated in FIG. 4, the transmit filter 61T includes a ground terminal 61Tg. The ground terminal 61Tg is connected to the via conductor 85 through the metal conductor 87. This can strengthen the grounding of the transmit filter 61T, thus enhancing the bandpass characteristics of the filter.

The metal conductor 87 includes a via connected to the ground terminal 61Tg and a flat pattern wiring (ground pattern) formed inside the module substrate 91. The metal conductor 87 may extend to a side surface of the module substrate 91 and be in contact with the metal shield layer 95.

For example, as illustrated in FIG. 4, the power amplifier 10 includes a ground terminal 10g. The ground terminal 10g is connected to the via conductor 86 through the metal conductor 88. This can strengthen the grounding of the power amplifier 10, thus enhancing the amplification characteristics.

The metal conductor 88 includes a via connected to the ground terminal 10g and a flat pattern wiring (ground pattern) formed inside the module substrate 91. The metal conductor 88 may extend to the side surface of the module substrate 91 and be in contact with the metal shield layer 95. The ground patterns can reduce the electromagnetic field coupling between each of the first component, the second component, and the fifth component disposed on the principal surface 91a side and each of the third component, the fourth component, and the sixth component disposed on the principal surface 91b side.

It should be noted that the metal conductor 87 and the metal conductor 88 may be provided separately or may be provided as a single component.

In the radio frequency module 1 according to the present embodiment, the transmit filter 61T and the transmit filter 62T are arranged on the different principal surface sides of the module substrate 91. With this configuration, the electromagnetic field coupling between the transmit filter 61T and the transmit filter 62T can be reduced more strongly. The pass band of one of the transmit filters 61T and 62T includes, for example, a frequency that is an integer multiple of a frequency included in the pass band of the other. In this case, a transmitting signal or harmonic waves thereof passing through the other of the transmit filters 61T and 62T may pass through the one of the transmit filters 61T and 62T. The noise interference can be sufficiently reduced by reducing the electromagnetic field coupling between the filters.

Although the metal shield wall 81 and the metal shield wall 83 extend along the y-axis and are in contact with the metal shield layer 95 at both end portions thereof, this is only an example. Spaces may be provided between both end portions of each of the metal shield walls 81 and 83 and the metal shield layer 95. The same applies to the metal shield walls 82 and 84.

Each of the metal shield walls 81 to 84 is a flat metal member. The lower ends 81b and 83b of the metal shield walls 81 and 83 are fixed to the principal surface 91a of the module substrate 91. The upper ends 82a and 84a of the metal shield walls 82 and 84 are fixed to the principal surface 91b of the module substrate 91. They are fixed using a conductive adhesive such as solder. Note that at least one of the metal shield walls 81 to 84 may be a metal wall grown by plating.

After fixing the metal shield walls 81 and 83, the resin member 92 can be formed by filling a space above the principal surface 91a and above the components fixed to the principal surface 91a with a resin material. Thereafter, the resin material 92 is cured. By polishing the formed resin member 92, the upper ends 81a and 83a of the metal shield walls 81 and 83 are exposed. At this time, the metal shield walls 81 and 83 and the components disposed on the principal surface 91a side may also be polished. Accordingly, the upper surface 92a of the resin member 92, the respective upper ends 81a and 83a of the metal shield walls 81 and 83, and the upper surfaces of the circuit components (e.g., the transmit filter 61T) are made flush with one another. The metal shield layer 95 is formed by sputtering on the upper surface 92a, the upper ends 81a and 83a, which have been made flush with one another by polishing. Accordingly, the metal shield walls 81 and 83 are each in contact with and are electrically connected to the metal shield layer 95.

The upper ends 81a and 83a are tip portions of the metal shield walls 81 and 83, respectively in an upright direction (a direction away from the principal surface 91a along a normal of the principal surface 91a, that is, upward). The lower ends 81b and 83b are end portions of the metal shield walls 81 and 83, respectively, opposite to the upper ends 81a and 83a. The upper ends 82a and 84a of the metal shield walls 82 and 84 provided on the principal surface 91b side are end portions on the module substrate 91 side. The lower ends 82b and 84b are end portions in a direction away from the module substrate 91.

In the present embodiment, the upper ends 81a and 83a are upper end faces of the metal shield walls 81 and 83, respectively, but are not limited thereto. For example, the metal shield walls 81 and 83 may be laterally placed triangular prisms, or pyramids, and the upper ends 81a and 83a may be straight segments or single points. The same applies to the lower ends 82b and 84b of the metal shield walls 82 and 84.

4. Modifications

Next, Modifications of the radio frequency module 1 according to Embodiment will be described.

4-1. Modification 1

Figure 5:
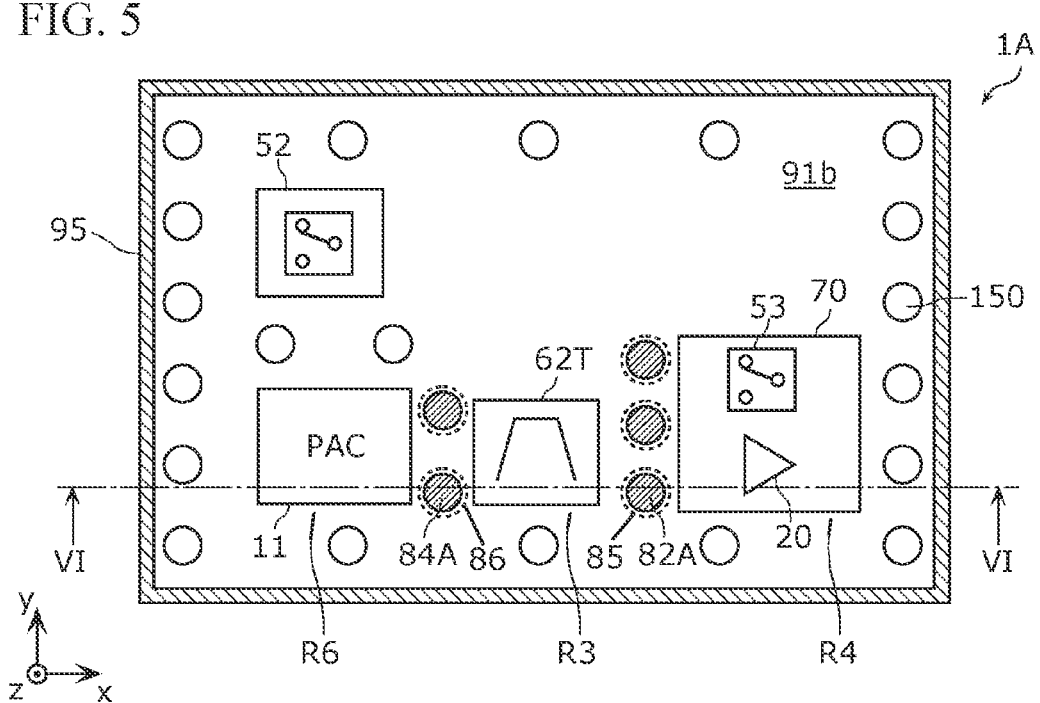
FIG. 5 is a plan view of a radio frequency module according to Modification 1.
Figure 6:
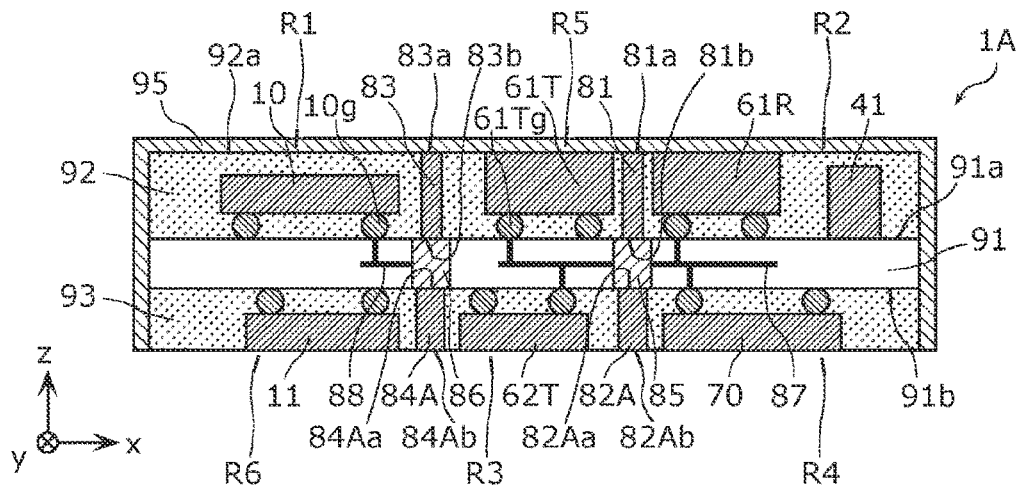
FIG. 6 is a sectional view of the radio frequency module according to Modification 1.

FIG. 5 is a plan view of a radio frequency module 1A according to Modification 1 of Embodiment. FIG. 6 is a sectional view of the radio frequency module 1A according to Modification 1 of Embodiment. FIG. 6 illustrates a cross section taken along line VI-VI in FIG. 5.

The radio frequency module 1A illustrated in FIGS. 5 and 6 includes electrode terminals 82A and 84A instead of the metal shield walls 82 and 84.

The electrode terminal 82A is an example of a first metal member and is disposed on the principal surface 91b side of the module substrate 91. An upper end 82Aa of the electrode terminal 82A is in contact with the via conductor 85. The electrode terminal 82A is electrically connected to the via conductor 85 and set to the ground potential, by being in contact with the via conductor 85. Thus, the electrode terminal 82A can reduce the electromagnetic field coupling between the respective components located on both sides of the electrode terminal 82A.

A lower end 82Ab of the electrode terminal 82A is exposed without being covered with the resin member 93. The lower end 82Ab of the electrode terminal 82A is connected to a ground terminal on a motherboard (not illustrated) to be disposed on a negative side of the z-axis of the radio frequency module 1A. This strengthens the grounding of the electrode terminal 82A and enhances the shielding function thereof.

The electrode terminal 82A is, for example, a columnar post electrode penetrating the resin member 93. The maximum width (e.g., diameter) of the electrode terminal 82A when viewed in plan is larger than a width (length in the x-axis direction) of the metal shield wall 81. Thus, the connection between the lower end 82Ab of the electrode terminal 82A and the ground terminal on the motherboard can be made stably with low resistance.

The electrode terminal 82A is disposed between the third component and the fourth component when viewed in plan, similar to the metal shield wall 82 of Embodiment. Thus, the electrode terminal 82A can reduce the electromagnetic field coupling between the third component (the transmit filter 62T) and the fourth component (the semiconductor integrated circuit 70).

The electrode terminal 84A is an example of a second metal member and is disposed on the principal surface 91b side of the module substrate 91. An upper end 84Aa of the electrode terminal 84A is in contact with the via conductor 86. The electrode terminal 84A is electrically connected to the via conductor 86 and set to the ground potential, by being in contact with the via conductor 86 physically. Thus, the electrode terminal 84A can reduce the electromagnetic field coupling between the respective components located on both sides of the electrode terminal 84A.

A lower end 84Ab of the electrode terminal 84A is exposed without being covered with the resin member 93. The lower end 84Ab of the electrode terminal 84A is connected to a ground terminal on the motherboard (not illustrated) to be disposed on the negative side of the z-axis of the radio frequency module 1A. This strengthens the grounding of the electrode terminal 84A and enhances the shielding function thereof.

The electrode terminal 84A is, for example, a columnar post electrode penetrating the resin member 93. The maximum width (e.g., diameter) of the electrode terminal 84A when viewed in plan is larger than a width (length in the x-axis direction) of the metal shield wall 83. Thus, the connection between the lower end 84Ab of the electrode terminals 84A and the ground terminal on the motherboard can be made stably with low resistance.

The electrode terminal 84A is disposed between the third component and the sixth component when viewed in plan, similar to the metal shield wall 84 of Embodiment. Thus, the electrode terminal 84A can reduce the electromagnetic field coupling between the third component (the transmit filter 62T) and the sixth component (the PA control circuit 11 or the switch 52).

As illustrated in FIG. 5, in the radio frequency module 1A, two or more electrode terminals 82A and two or more electrode terminals 84A are separately aligned along the y-axis direction. The directions in which the electrode terminals 82A and 84A are aligned are the same as the directions in which the metal shield walls 81 and 83 extend, respectively. The two or more electrode terminals 82A are electrically connected to the metal shield wall 81 through the via conductors 85, respectively. Thus, each of the electrode terminal 82A, the via conductor 85, and the metal shield wall 81 is connected and aligned in a straight line in the thickness direction of the module substrate 91. The same applies to the two or more electrode terminals 84A. Only one of the electrode terminals 82A and 84A may be provided in the radio frequency module 1A.

4-2. Modification 2

Figure 7:
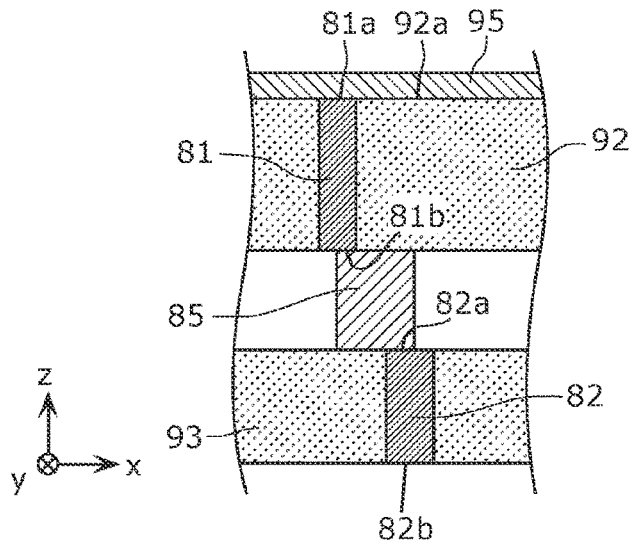
FIG. 7 is a partially enlarged sectional view of a radio frequency module according to Modification 2.

FIG. 7 is a partially enlarged sectional view of a radio frequency module according to Modification 2. To be specific, FIG. 7 is an enlarged sectional view illustrating the via conductor 85 and the vicinity thereof.

In the radio frequency module according to Modification 2, the via conductor 85 overlaps each of the metal shield walls 81 and 82 when viewed in plan. On the other hand, the metal shield wall 81 and the metal shield wall 82 do not overlap when viewed in plan. That is, the metal shield wall 81, the via conductor 85, and the metal shield wall 82 are not aligned in a straight line in the thickness direction of the module substrate 91. The metal shield wall 81 and the metal shield wall 82 are shifted from each other in the x-axis direction. An area where the metal shield wall 81 and the via conductor 85 overlap when viewed in plan does not overlap an area where the metal shield wall 82 and the via conductor 85 overlap when viewed in plan.

Even in this case, similar to the radio frequency module 1 according to Embodiment, the electromagnetic field coupling between the respective components arranged in the regions R2 to R5 can be reduced.

4-3. Modification 3

Figure 8:
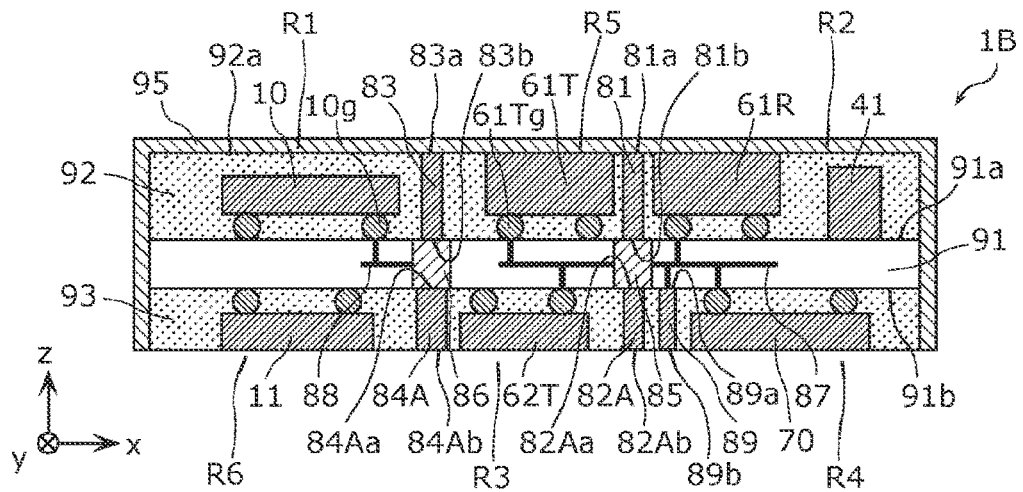
FIG. 8 is a sectional view of a radio frequency module according to Modification 3.

FIG. 8 is a sectional view of a radio frequency module 1B according to Modification 3. The radio frequency module 1B illustrated in FIG. 8 further includes a metal shield wall 89 as compared with the radio frequency module 1A according to Modification 1.

The metal shield wall 89 is an example of a second metal wall, and is disposed on the principal surface 91*b* side of the module substrate 91. As illustrated in FIG. 8, an upper end 89*a* of the metal shield wall 89 is in contact with the metal conductor 87 provided in the module substrate 91. The metal shield wall 89 is electrically connected to the metal conductor 87 and set to the ground potential, by being in contact with the metal conductor 87 physically. Thus, the metal shield wall 89 can reduce the electromagnetic field coupling between components located on both sides of the metal shield wall 89.

The metal shield wall 89 is disposed between the third component and the fourth component when viewed in plan. Thus, the metal shield wall 89 can reduce the electromagnetic field coupling between the third component (the transmit filter 62T) and the fourth component (the semiconductor integrated circuit 70).

In the present modification, a lower end 89*b* of the metal shield wall 89 is exposed without being covered with the resin member 93. The lower end 89*b* of the metal shield wall 89 may be connected to a ground terminal on a motherboard (not illustrated) disposed on a negative side of the z-axis of the radio frequency module 1B. This strengthens the grounding of the metal shield wall 89 and enhances the shielding function thereof.

In the present modification, the electrode terminal 82A and the metal shield wall 89, each of which is set to the ground potential, are arranged between the third component and the fourth component. With this configuration, the electromagnetic field coupling between the third component and the fourth component can be reduced more strongly.

In FIG. 8, the metal shield wall 89 is disposed on a positive side of the x-axis with respect to the electrode terminal 82A, but may be disposed on the negative side of the x-axis. Instead of the metal shield wall 89, or in addition to the metal shield wall 89, a metal shield wall may be disposed between the third component and the sixth component. In other words, the metal shield wall may be disposed adjacent to the electrode terminal 84A. The metal shield wall 89 and the electrode terminal 82A may be in contact with each other.

5. Effects and Others

As described above, the radio frequency module according to the present embodiment includes the module substrate 91 having the principal surface 91*a* and the principal surface 91*b* opposite to the principal surface 91*a*, the first component and the second component arranged on the principal surface 91*a* side, the third component disposed on the principal surface 91*b* side, the resin member 92 covering the principal surface 91*a*, the side surface of the first component, and the side surface of the second component, the metal shield layer 95 set to the ground potential and covering the upper surface 92*a* of the resin member 92, the metal shield wall 81 disposed on the principal surface 91*a* side, the first metal member disposed on the principal surface 91*b* side, and the via conductor 85 penetrating the module substrate 91. The metal shield wall 81 is disposed between the first component and the second component when the principal surface 91*a* is viewed in plan. The upper end 81*a* of the metal shield wall 81 is in contact with the metal shield layer 95. The via conductor 85 electrically connects the metal shield wall 81 and the first metal member, and at least partially overlaps each of the metal shield wall 81 and the first metal member when viewed in plan.

Thus, it is possible to reduce not only the electromagnetic field coupling between the components arranged on the principal surface 91*a* side and the electromagnetic field coupling between the components arranged on the principal surface 91*b* side but also the electromagnetic field coupling between the components arranged on the principal surface 91*a* side and the components arranged on the principal surface 91*b* side. Therefore, an effect of reducing noise the interference between the components can be enhanced.

For example, the radio frequency module further includes the fourth component disposed on the principal surface 91*b* side. The first metal member is disposed between the third component and the fourth component when viewed in plan.

Thus, the electromagnetic field coupling between the third component and the fourth component on the principal surface 91*b* side can be reduced.

For example, the first metal member is the metal shield wall 82.

Thus, the metal shield wall 82 can widely shield between the components arranged on the principal surface 91*b* side, thereby reducing the electromagnetic field coupling between the components. In addition, the metal shield wall 82 can be disposed without being limited by the layout of the electrode terminal to be connected to the motherboard, thus increasing layout flexibility. Therefore, the metal shield wall 82 can be disposed and shaped so as to further enhance the effect of reducing the noise interference.

For example, the first metal member may be the electrode terminal 82A.

Thus, the ground terminal of the motherboard and the electrode terminal can be stably connected, thus strengthening the grounding of the electrode terminal. By strengthening the grounding, the shielding effect of the electrode terminal is enhanced, and the effect of reducing the noise interference can be further enhanced.

For example, the radio frequency module according to the present embodiment may further include the metal shield wall 89 disposed on the principal surface 91*b* side. The metal shield wall 89 is disposed between the third component and the fourth component when viewed in plan.

Thus, by arranging the electrode terminal 82A and the metal shield wall 89 between the components, the shielding effect can be further enhanced.

For example, at least part of the overlap of the metal shield wall 81 and the via conductor 85 when viewed in plan overlaps the first metal member when viewed in plan.

Thus, the metal shield wall 81, the via conductor 85, and the first metal member can be connected and aligned in a straight line along the thickness direction of the module substrate 91, so that they can be connected by the shortest path. Therefore, the generation of unwanted components such as parasitic inductors and parasitic capacitors can be reduced, thereby reducing the degradation of the characteristics of the components included in the radio frequency module 1.

For example, any one of the first component, the second component, the third component, and the fourth component includes the ground terminal. The radio frequency module 1 further includes the metal conductor 87 connecting the ground terminal and the via conductor 85.

This can strengthen the grounding of the component, thus enhancing the electrical characteristics of the component.

For example, the component including the ground terminal includes the power amplifier 10 or the filter.

This can strengthen the grounding of the power amplifier 10 or the filter, thus enhancing the amplification characteristics or filter characteristics.

For example, the first component includes the power amplifier 10 or the transmit filter 61T, and part of the first component is in contact with the metal shield layer 95.

Thus, the heat generated in the first component is conducted to the metal shield layer 95, thereby enhancing the heat dissipation. In addition, the heat can be dissipated to the motherboard through the metal shield layer 95, the metal shield walls 81 to 84, and the via conductors 85 and 86, further improving the heat dissipation.

For example, the first component includes the power amplifier 10. The second component includes the receive filter 61R. The third component includes the transmit filter 62T. The fourth component includes the low noise amplifier 20. The first component is disposed on the same side (negative side of the x-axis) as the third component with respect to the metal shield wall 81 (the metal shield wall 82) when viewed in plan. The second component is disposed on the same side (positive side of the x-axis) as the fourth component with respect to the metal shield wall 81 (the metal shield wall 82) when viewed in plan.

This enhances the isolation between the transmission and the reception. For example, the harmonic components generated in the power amplifier 10 can be reduced to flow into the low noise amplifier 20, thereby reducing the degradation of the reception sensitivity.

For example, the radio frequency module 1 further includes the fifth component disposed on the principal surface 91a side, the sixth component disposed on the principal surface 91b side, the metal shield wall 83 disposed on the principal surface 91a side, the second metal member disposed on the principal surface 91b side, and the via conductor 86 penetrating the module substrate 91. The metal shield wall 83 is disposed between the first component and the fifth component when viewed in plan. The upper end 83a of the metal shield wall 83 is in contact with the metal shield layer 95. The second metal member is disposed between the sixth component and the third component when viewed in plan. The via conductor 86 electrically connects the metal shield wall 83 and the second metal member, and at least partially overlaps each of the metal shield wall 83 and the second metal member when viewed in plan.

Thus, since the two connection structures, each of which includes the metal shield wall, the via conductor, and the metal member, are provided, the electromagnetic field coupling between the components can be reduced more strongly.

For example, the fifth component includes the transmit filter 61T, which has the pass band different from that of the transmit filter 62T. The sixth component includes the PA control circuit 11 that controls the power amplifier 10. The fifth component is disposed on the same side (positive side of the x-axis) as the second component with respect to the metal shield wall 83 (metal shield wall 84) when viewed in plan. The third component is disposed on the same side (positive side of the x-axis) as the fourth component with respect to the metal shield wall 83 (metal shield wall 84) when viewed in plan. For example, the pass band of one of the transmit filter 61T and the transmit filter 62T includes a frequency that is an integer multiple of a frequency included in the pass band of the other.

Thus, the electromagnetic field coupling between the transmit filters is reduced, thereby reducing the degradation of the quality of the transmitting signal.

For example, the thickness of the first metal member may be thicker than the thickness of the metal shield wall 81. It should be noted that the thickness of the metal shield wall 81 is the length of the metal shield wall 81 in the direction orthogonal to the direction in which the metal shield wall 81 extends in parallel with the principal surface 91a of the module substrate 91 (to be specific, the x-axis direction). The same applies to the thicknesses of the other metal shield walls. The thickness of the first metal member is the length in the same direction as the thickness direction of the metal shield wall 81.

Thus, the electromagnetic field coupling between the components can be reduced more strongly. For example, even when the metal shield wall 81 cannot be made thick due to a large number of mounted components on the principal surface 91a side, the thick first metal member (e.g., the metal shield wall 82 or the electrode terminal 82A) on the principal surface 91b side can strengthen the grounding and enhance the shielding function.

For example, the radio frequency module 1 may further include the metal conductor connected to the via conductor 85 and provided inside the module substrate 91 in parallel with the principal surface 91a. This metal conductor is, for example, a part of the metal conductor 87 and is the flat pattern wiring (ground pattern).

This can reduce the electromagnetic field coupling between the components arranged on the principal surface 91a side of the module substrate 91 (in the regions R1, R5, and R2) and the components arranged on the principal surface 91b side of the module substrate 91 (in the regions R6, R3, and R4).

The communication device 5 according to the present embodiment includes the RFIC 3 that processes a radio frequency signal to be transmitted and received by the antenna 2, and the radio frequency module 1 that transmits the radio frequency signal between the antenna 2 and the RFIC 3.

Thus, as in the radio frequency module 1 described above, the effect of reducing the noise interference between components can be enhanced.

Others

Although the radio frequency module and the communication device according to the present disclosure have been described based on Embodiment and Modifications thereof described above, the present disclosure is not limited to Embodiment described above.

The allocation of the plurality of components included in the radio frequency module 1 to the regions R1 to R6 is not limited. Among the regions R1 to R6, there may be regions in which no components are arranged.

The radio frequency module 1 does not have to include the resin member 93. That is, the components and the metal shield walls arranged on the principal surface 91b side of the module substrate 91 may be exposed without being covered with the resin member.

For example, the width of the metal shield wall may be longer than the maximum width of the via conductor. The maximum width of the electrode terminal may be longer than the maximum width of the via conductor.

In addition, the present disclosure includes embodiments obtained by applying various modifications conceived by those skilled in the art to Embodiment and Modifications and embodiments implemented by appropriately combining constituent elements and functions in Embodiment and Modifications without departing from the gist of the present disclosure.

The present disclosure can be widely used in communication devices such as mobile phones by being employed in a radio frequency module disposed in a multi-band front end.

1, 1A, 1B RADIO FREQUENCY MODULE
2 ANTENNA
3 RFIC
4 BBIC
5 COMMUNICATION DEVICE
10 POWER AMPLIFIER
10g, 61Tg GROUND TERMINAL
11 PA CONTROL CIRCUIT
20 LOW NOISE AMPLIFIER
31, 32, 41, 42 MATCHING CIRCUIT
51, 52, 53 SWITCH
61, 62 DUPLEXER
61R, 62R RECEIVE FILTER
61T, 62T TRANSMIT FILTER
70 SEMICONDUCTOR INTEGRATED CIRCUIT
81, 82, 83, 84, 89 METAL SHIELD WALL
81a, 82a, 82Aa, 83a, 84a, 84Aa, 89a UPPER END
81b, 82b, 82Ab, 83b, 84b, 84Ab, 89b LOWER END
82A, 84A ELECTRODE TERMINAL
85, 86 VIA CONDUCTOR
87, 88 METAL CONDUCTOR
91 MODULE SUBSTRATE
91a, 91b PRINCIPAL SURFACE
92, 93 RESIN MEMBER
92a UPPER SURFACE
95 METAL SHIELD LAYER
100 ANTENNA CONNECTION TERMINAL
110 RADIO FREQUENCY INPUT TERMINAL
111 CONTROL INPUT TERMINAL
120 RADIO FREQUENCY OUTPUT TERMINAL
150 EXTERNAL CONNECTION TERMINAL
511, 512, 513, 521, 522, 523, 531, 532, 533 TERMINAL
AR, BR RECEIVE PATH
AT, BT TRANSMIT PATH
R1, R2, R3, R4, R5, R6 REGION

The invention claimed is:

1. A radio frequency module comprising:
a module substrate having a first principal surface and a second principal surface opposite to the first principal surface;
a first component and a second component arranged on the first principal surface;
a third component disposed on the second principal surface;
a resin member covering the first principal surface, a side surface of the first component, and a side surface of the second component;
a metal layer set to ground potential and covering an upper surface of the resin member;
a first metal wall disposed on the first principal surface and set to the ground potential;
a first metal member disposed on the second principal surface; and
a first via conductor penetrating the module substrate, wherein
the first metal wall is disposed between the first component and the second component when the first principal surface is viewed in plan,
an upper end of the first metal wall is in contact with the metal layer, and
the first via conductor electrically connects the first metal wall and the first metal member, and at least partially overlaps each of the first metal wall and the first metal member when viewed in plan.

2. The radio frequency module according to claim 1 further comprising:
a fourth component disposed on the second principal surface, wherein
the first metal member is disposed between the third component and the fourth component when viewed in plan.

3. The radio frequency module according to claim 2 further comprising:
a second metal wall disposed on the second principal surface and set to the ground potential, wherein
the second metal wall is disposed between the third component and the fourth component when viewed in plan.

4. The radio frequency module according to claim 2, wherein
the first component includes a power amplifier,
the second component includes a receive filter,
the third component includes a first transmit filter,
the fourth component includes a low noise amplifier,
the first component is disposed on a same side as the third component with respect to the first metal wall when viewed in plan, and
the second component is disposed on a same side as the fourth component with respect to the first metal wall when viewed in plan.

5. The radio frequency module according to claim 4 further comprising:
a fifth component disposed on the first principal surface;
a sixth component disposed on the second principal surface;
a third metal wall disposed on the first principal surface and set to the ground potential;
a second metal member disposed on the second principal surface; and
a second via conductor penetrating the module substrate, wherein
the third metal wall is disposed between the first component and the fifth component when viewed in plan,
an upper end of the third metal wall is in contact with the metal layer,
the second metal member is disposed between the sixth component and the third component when viewed in plan, and
the second via conductor electrically connects the third metal wall and the second metal member, and at least partially overlaps each of the third metal wall and the second metal member when viewed in plan.

6. The radio frequency module according to claim 5, wherein the fifth component includes a second transmit filter having a pass band different from a pass band of the first transmit filter, the sixth component includes a control circuit configured to control the power amplifier, the fifth component is disposed on a same side as the second component with respect to the third metal wall when viewed in plan, and the third component is disposed on a same side as the fourth component with respect to the third metal wall when viewed in plan.

7. The radio frequency module according to claim 6, wherein a pass band of one of the first transmit filter and the second transmit filter includes a frequency being an integer multiple of a frequency included in a pass band of another of the first transmit filter and the second transmit filter.

8. The radio frequency module according to claim 1, wherein the first metal member is a metal wall.

9. The radio frequency module according to claim 1, wherein the first metal member is an electrode terminal.

10. The radio frequency module according to claim 1, wherein at least a part of an overlap of the first metal wall and the first via conductor when viewed in plan overlaps the first metal member when viewed in plan.

11. The radio frequency module according to claim 1, wherein any one component of the first component, the second component, and the third component has a ground terminal, and the radio frequency module further comprises:

a metal conductor configured to connect the ground terminal and the first via conductor.

12. The radio frequency module according to claim 11, wherein the one component having the ground terminal includes a power amplifier or a filter.

13. The radio frequency module according to claim 1, wherein the first component includes a power amplifier or a first transmit filter, and a part of the first component is in contact with the metal layer.

14. The radio frequency module according to claim 1, wherein a thickness of the first metal member is thicker than a thickness of the first metal wall.

15. The radio frequency module according to claim 1 further comprising:

a metal conductor connected to the first via conductor and provided inside the module substrate in parallel with the first principal surface.

16. A communication device comprising:

an RF signal processing circuit configured to process a radio frequency signal transmitted and received by an antenna; and the radio frequency module according to claim 1, configured to transmit the radio frequency signal between the antenna and the RF signal processing circuit.

17. The radio frequency module according to claim 3, wherein the first component includes a power amplifier, the second component includes a receive filter, the third component includes a first transmit filter, the fourth component includes a low noise amplifier, the first component is disposed on a same side as the third component with respect to the first metal wall when viewed in plan, and the second component is disposed on a same side as the fourth component with respect to the first metal wall when viewed in plan.

18. The radio frequency module according to claim 2, wherein the first metal member is a metal wall.

19. The radio frequency module according to claim 3, wherein the first metal member is a metal wall.

20. The radio frequency module according to claim 4, wherein the first metal member is a metal wall.

* * * * *